UNITED STATES PATENT OFFICE.

DAVID K. TUTTLE AND ORAZIO LUGO, OF BALTIMORE, MARYLAND.

IMPROVEMENT IN THE PREPARATION OF GLUE-STOCK AND OTHER PRODUCTS FROM ANIMAL SUBSTANCES.

Specification forming part of Letters Patent No. 89,709, dated May 4, 1869.

*To all whom it may concern:*

Be it known that we, DAVID K. TUTTLE and ORAZIO LUGO, of the city and county of Baltimore and State of Maryland, have invented a new and useful Process for the Preparation of Glue-Stock and other Products from Animal Substances; and we hereby declare the following to be a full and exact description of the same.

The nature of our invention consists in obtaining pure glue-stock from such substances as contain glue-forming materials by eliminating and saving the oils and fats therein contained, and this we accomplish by means of benzine, naphtha, or other equivalent hydrocarbons, in the manner hereafter described.

The crude animal substances, flesh, fats, skins, tendons, bones, horns, feet, &c., either with or without a previous treatment with lime, are treated with benzine or other equivalent hydrocarbon, in a proper vessel, provided with a condensing apparatus for saving any vaporized benzine, &c., or in a closed vessel at an elevated temperature. After a few hours' digestion the hydrocarbon solution of the oils and fats is drawn off, and may be treated by any of the well-known methods for recovering the volatile hydrocarbons, which may be again used in subsequent operations. The oils and fats are saved and utilized. The animal matters, or purified glue-stock, are now ready for conversion into glue by heating with water in the ordinary way.

We have also found that satisfactory results are obtained by the following modification of the process, viz: The crude glue-making materials, after having been treated with any aqueous solution for purification, and while in a hydrated condition, are treated with a sufficient quantity of benzine, or other equivalent hydrocarbon, to dissolve the oils and fats. Heat is applied by live steam, or other suitable means, whereby, in a few hours, a hydrocarbon solution of the oily and fatty matters, and an aqueous substratum containing the gelatine or glue, are obtained. These solutions are separated by decantation. The former is treated for the recovery of the hydrocarbon and of the oils and fats. The latter is converted into marketable glue by the ordinary process.

Any other equivalent solvents of the fats and oils, such as bisulphide of carbon and the various ethers, may be used for treating crude glue-stock, but we prefer those herein mentioned.

Having thus described our invention, what we claim, and desire to secure by Letters Patent of the United States, is—

The process herein described for preparing glue-stock, the same consisting in treating the glue-stock material with benzine, naphtha, or other equivalent solvent of the oils and fats, substantially as described.

ORAZIO LUGO.
DAVID K. TUTTLE.

Witnesses:
EDM. F. BROWN,
HENRY ERNI.